(12) United States Patent
Chuang

(10) Patent No.: US 9,894,499 B2
(45) Date of Patent: Feb. 13, 2018

(54) SYSTEMS AND METHODS FOR PROVIDING INSTANT MESSAGING WITH VERIFICATION FEATURE

(71) Applicant: CyberLink Corp., Shindian, Taipei (TW)

(72) Inventor: Fu-Kai Chuang, Taipei (TW)

(73) Assignee: CYBERLINK CORP., Shindian, Taipei (TW)

( * ) Notice: Subject to any disclaimer, the term of this patent is extended or adjusted under 35 U.S.C. 154(b) by 0 days.

(21) Appl. No.: 15/600,940

(22) Filed: May 22, 2017

(65) Prior Publication Data
US 2017/0347247 A1 Nov. 30, 2017

Related U.S. Application Data

(60) Provisional application No. 62/343,024, filed on May 30, 2016.

(51) Int. Cl.
| H04W 4/00 | (2009.01) |
| H04W 4/12 | (2009.01) |
| H04L 12/58 | (2006.01) |
| H04L 29/12 | (2006.01) |
| G06F 3/0487 | (2013.01) |
| H04W 12/06 | (2009.01) |
| H04W 88/02 | (2009.01) |

(52) U.S. Cl.
CPC .......... *H04W 4/12* (2013.01); *G06F 3/0487* (2013.01); *H04L 51/04* (2013.01); *H04L 61/2069* (2013.01); *H04W 12/06* (2013.01); *H04W 88/02* (2013.01)

(58) Field of Classification Search
None
See application file for complete search history.

(56) References Cited

U.S. PATENT DOCUMENTS

| 8,413,060 | B1 | 4/2013 | Agrawal |
| 9,215,095 | B2 | 12/2015 | Weaver et al. |
| 2003/0236847 | A1* | 12/2003 | Benowitz ............... H04L 51/12 709/206 |
| 2007/0043822 | A1 | 2/2007 | Brumfield |
| 2007/0067404 | A1 | 3/2007 | Brown et al. |
| 2007/0088793 | A1* | 4/2007 | Landsman ............. H04L 51/12 709/207 |
| 2008/0177835 | A1 | 7/2008 | Chaar et al. |
| 2009/0248816 | A1 | 10/2009 | Appelman et al. |
| 2009/0260062 | A1* | 10/2009 | Burkhart ............... H04L 51/043 726/3 |
| 2013/0080927 | A1 | 3/2013 | Weaver et al. |

* cited by examiner

*Primary Examiner* — Shantell L Heiber
(74) *Attorney, Agent, or Firm* — McClure, Qualey & Rodack, LLP

(57) ABSTRACT

In an instant messaging device, a selection is received from a user, where the selection specifying a plurality of contacts to participate in an instant messaging session. At least one attribute type corresponding to the at least one intended recipient is retrieved in response to detecting a trigger event relating to a message intended for at least one recipient among the plurality of contacts. A verification operation is retrieved for each of the retrieved at least one attribute type. At least one retrieved verification operations is executed. The message is sent to the at least one intended recipient in response to successful execution of the at least one of the retrieved verification operations.

18 Claims, 13 Drawing Sheets

SYSTEMS AND METHODS FOR PROVIDING INSTANT MESSAGING WITH VERIFICATION FEATURE

CROSS-REFERENCE TO RELATED APPLICATION

This application claims priority to, and the benefit of, U.S. Provisional Patent Application entitled, "Systems and Methods for Providing Instant Messaging with Verification Feature," having Ser. No. 62/343,024, filed on May 30, 2016, which is incorporated by reference in its entirety.

TECHNICAL FIELD

The present disclosure generally relates to communications and more particularly, to systems and methods for providing an instant messaging platform with a verification feature.

BACKGROUND

As smartphones and other mobile devices have become ubiquitous, people have the ability to stay connected more than ever. However, while text messaging is commonly used, instant messaging remains a popular form of communications as users are able to communicate essentially in real-time over a networked environment. Typically, a user initiates an instant messaging session with a remote user, where both users communicate by typing messages via a user interface, and the messages are then displayed on their respective displays.

Users will many times have a variety of contacts in their contacts list, where some contacts may comprise colleagues from work while other contacts may comprise friends, families, or casual acquaintances. When communicating with a friend or family member, the user may engage in a more casual exchange whereas when communicating with a supervisor at work, the user may engage in a more formal exchange due to the employer-employee relationship. In some instances, a user may also exchange sensitive corporate information during an instant messaging session. In such scenarios, it is essential for the user to avoid inadvertently sending sensitive information (e.g., a corporate file) to the wrong recipient. Similarly, inadvertently sending a casual message to a supervisor that was intended for a friend can be embarrassing.

SUMMARY

In an instant messaging device, a selection is received from a user, where the selection specifying a plurality of contacts to participate in an instant messaging session. At least one attribute type corresponding to the at least one intended recipient is retrieved in response to detecting a trigger event relating to a message intended for at least one recipient among the plurality of contacts. A verification operation is retrieved for each of the retrieved at least one attribute type. At least one retrieved verification operations is executed. The message is sent to the at least one intended recipient in response to successful execution of the at least one of the retrieved verification operations.

Another embodiment is a system that comprises a memory storing instructions and a processor coupled to the memory. The processor is configured by the instructions to receive a selection from a user, the selection specifying a plurality of contacts to participate in an instant messaging session and retrieve at least one attribute type corresponding to the at least one intended recipient in response to detecting a trigger event relating to a message intended for at least one recipient among the plurality of contacts. The processor is further configured to retrieve a verification operation for each of the retrieved at least one attribute type, execute at least one of the retrieved verification operations, and send the message to the at least one intended recipient in response to successful execution of the at least one of the retrieved verification operations.

Another embodiment is a non-transitory computer-readable storage medium storing instructions to be implemented by a computing device having a processor. The instructions, when executed by the processor, cause the computing device to receive a selection from a user, the selection specifying a plurality of contacts to participate in an instant messaging session and retrieve at least one attribute type corresponding to the at least one intended recipient in response to detecting a trigger event relating to a message intended for at least one recipient among the plurality of contacts. The instructions, when executed by the processor, further cause the computing device to retrieves a verification operation for each of the retrieved at least one attribute type, execute at least one of the retrieved verification operations, and send the message to the at least one intended recipient in response to successful execution of the at least one of the retrieved verification operations.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Various embodiments are disclosed for incorporating a safeguard feature in an instant messaging (IM) system for avoiding inadvertent exchanges with unintended recipients. A user specifies one or more attribute types for one or more individuals in a contact list, where each attribute type has a corresponding unique verification operation. Once a user engages in an IM session with a particular contact, the verification operation of the attribute type associated with that particular contact must be successfully executed prior to a message being sent to the contact.

In accordance with various embodiments, a contact may be assigned more than one attribute type. Where the corresponding verification operations do not conflict, the user must successfully execute each of the verification operations in order to send a message to that contact. For purposes of this disclosure, verification operations conflict when an associated action of one verification operation contradicts or is incompatible with an associated action of another verification operation. It should also be emphasized that the associated actions may or may not require the user to take action.

An example of a verification operation that requires action on the part of the user comprises the user being prompted to enter a password or the user performing a pre-defined gesture on a touch screen display. In some instances, the verification operation may require the user to send a message within a predetermined period of time, where the period of time may vary by the attribute type. An example of an action that does not require action on the part of the user comprises the user interface changing to a particular color. In the example user interface shown, the color of region 910 and/or region 920 can be changed.

An example where two verification operations contradict comprises changing the user interface to specific colors, where the two colors differ. Another example where two verification operations contradict comprises the user entering specific passwords, where the passwords differ. That is, one password is set for a first attribute type while a second password is set for a second attribute type. Where corresponding operations associated with multiple attribute types conflict, the system resolves the conflict and upon successful execution of one or more of the verification operations, the user is able to send a message to the intended recipient. In accordance with some embodiments, the system may resolve a conflict by determining which attribute type has the higher or highest priority and utilizing only the corresponding verification operation associated with the attribute type with the higher or highest priority.

Figure 1:
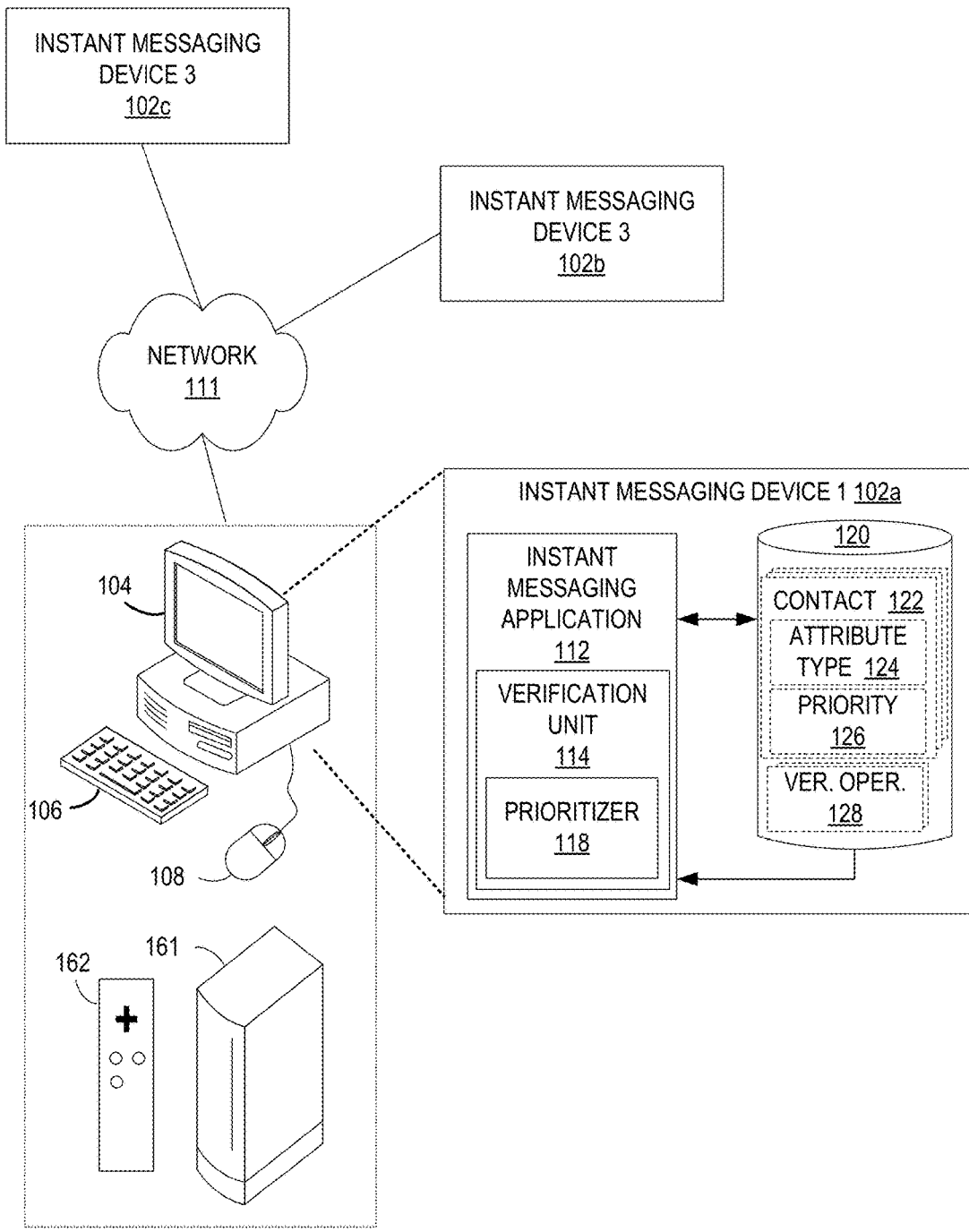
FIG. 1 is a block diagram of a networked environment in which embodiments of an instant messaging system may be implemented in accordance with various embodiments.

A description of a system for implementing verification features in an instant messaging platform is now described followed by a discussion of the operation of the components within the system. FIG. 1 is a block diagram of a networked environment in which a plurality of instant messaging devices 102a-102c is communicatively coupled via a network 111 such as the Internet. Each of the instant messaging devices 102a-102c may be embodied, for example, as a desktop computer, computer workstation, laptop, smartphone, tablet, or other computing system. In other embodiments, the instant messaging devices 102a-102c may be embodied as a video gaming console 161, which includes a video game controller 162 for receiving user preferences. For such embodiments, the video gaming console 161 may be connected to a television (not shown) or other display.

Each of the instant messaging devices 102a-102c may include a display 104 and input devices such as a keyboard 106 and a mouse 108, and/or touchscreen. The instant messaging devices 102a-102c may be coupled to a network 111, such as the Internet or a local area network (LAN), where the instant messaging devices 102a-102c may be configured to communicate directly with each other in a peer-to-peer configuration. Each instant messaging device 102a-102c comprises an instant messaging application 112 executed by a processing device in the instant messaging device 102a-102c to generate a user interface for facilitating instant messaging sessions and for prompting the user to execute one or more verification operations 128 prior to sending a message to the recipient.

The instant messaging device 102a-102c further comprises a verification unit 114 executed by a processing device in the instant messaging device 102a-102c that ensures that messages are sent by the user to the intended recipient. Specifically, when the user engages in a new IM session with a particular contact 122, the verification unit 114 retrieves the corresponding attribute type 124 from a data store 120 and prompts the user to execute the verification operation 128. If the verification operation 128 is successfully executed, the verification unit 114 notifies the instant messaging application 112 to send the pending message to the contact 122.

The prioritizer 118 in the verification unit 114 is configured to examine the priorities 126 of attributes when a particular contact 122 has multiple assigned attribute types 124 or where there are multiple participants in an IM session associated with multiple attribute types 124. For example, a contact 122 may be designated by the user as being both a co-worker (e.g., "work" type attribute) and a friend (e.g., "friend" type attribute). If the corresponding verification operations 128 do not conflict, then both verification operations 128 must be executed before a message is sent to the contact 122.

To illustrate, suppose that the "work" type attribute has a corresponding verification operation 128 where the user is prompted to enter a first password before a message will be sent. Suppose that the "friend" type attribute similarly has a corresponding verification operation 128 where the user is prompted to enter a second password before a message will be sent. Assume for this example that the "work" type attribute has a password that differs from that of the "friend" type attribute. For example, the "work" type attribute may have an 8-character/digit password, whereas the "friend" type only has a 4-character/digit password.

In this scenario, the prioritizer 118 will determine which attribute type 124 has a higher pre-assigned priority 126. Assuming that the "work" type attribute has a higher pre-assigned priority 126 than the "friend" type attribute, the user will be required to correctly enter the 8-character/digit password before a message will be sent to that contact 122.

Note that in the context of this disclosure, a verification operation 128 will not necessarily require action (e.g., entering a password) on the part of the user. Note also that in some scenarios, each contact 122 can have a different verification operation 128 where none of the verification operations 128 conflict. In such instances, all of the verification operations 128 are executed. In situations where none of the verification operations 128 conflict, the verification operations 128 may be executed in random order. As an alternative, the use may be required to execute the verification operations 128 in a particular order where the order is based on the corresponding priorities of the verification operations 128.

The verification operation 128 may also comprise operations that simply alert or remind the user that the user is of a particular attribute type 124. For example, for a "friend" type attribute, the verification operation 128 may comprise turning a background color of the user interface from a default color (e.g., white) to another color (e.g., green). In such instances, no action is required on the part of the user. In the context of this disclosure, a verification operation 128 is successfully executed if the user correctly enters the required input (e.g., password) for verification operations 128 where user input is involved. For verification operations 128 that do not involve user input, the completion of the verification operation 128 corresponds to successful execution of the verification operation 128.

Figure 2:
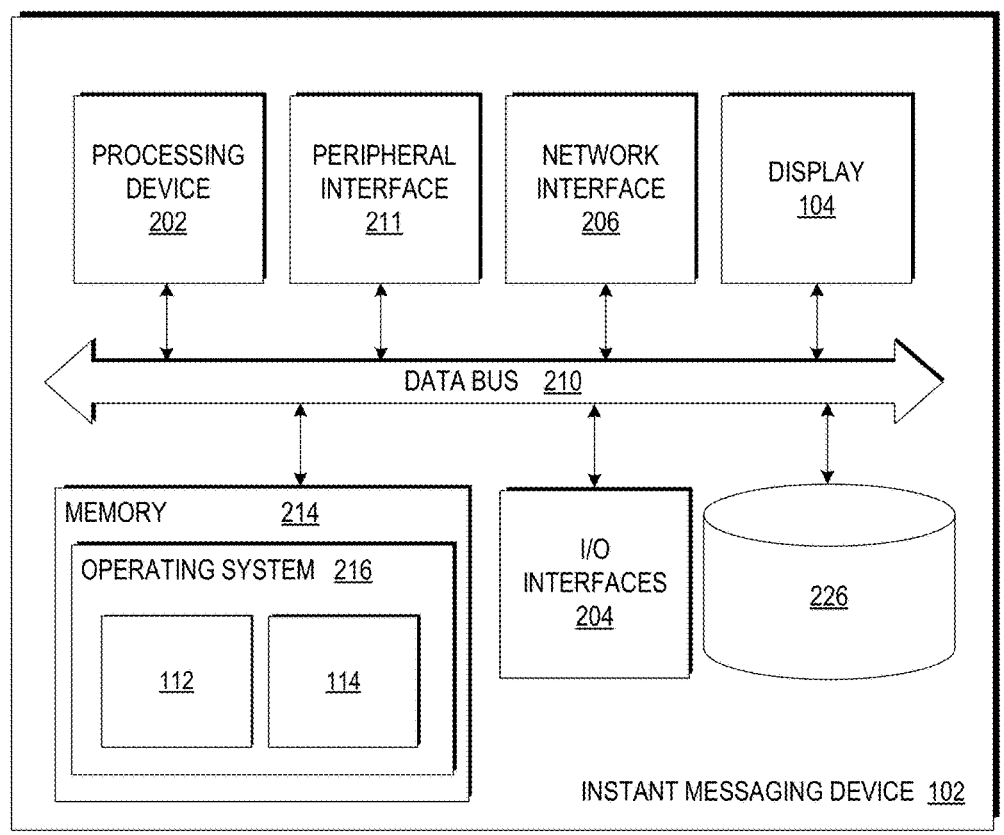
FIG. 2 illustrates an embodiment of the instant messaging devices shown in FIG. 1 in accordance with various embodiments.

FIG. 2 illustrates an embodiment of the instant messaging devices 102a-102c shown in FIG. 1. The instant messaging devices 102a-102c may be embodied in any one of a wide variety of wired and/or wireless computing devices, such as a desktop computer, portable computer, dedicated server computer, multiprocessor computing device, smart phone, tablet, and so forth. As shown in FIG. 2, each of the instant messaging devices 102a-102c comprises memory 214, a processing device 202, a number of input/output interfaces 204, a network interface 206, a display 104, a peripheral interface 211, and mass storage 226, wherein each of these components are connected across a local data bus 210.

The processing device 202 may include any custom made or commercially available processor, a central processing unit (CPU) or an auxiliary processor among several processors associated with the instant messaging devices 102a-102c, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 214 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 214 typically comprises a native operating system 216, one or more native applications, emulation systems, or emulated applications for any of a variety of operating systems and/or emulated hardware platforms, emulated operating systems, etc. For example, the applications may include application specific software which may comprise some or all the components 112, 114 of the instant messaging devices 102a-102c depicted in FIG. 1. In accordance with such embodiments, the components 112, 114 are stored in memory 214 and executed by the processing device 202. One of ordinary skill in the art will appreciate that the memory 214 can, and typically will, comprise other components which have been omitted for purposes of brevity.

Input/output interfaces 204 provide any number of interfaces for the input and output of data. For example, where the instant messaging devices 102a-102c comprises a personal computer, these components may interface with one or more user input/output interfaces 204, which may comprise a keyboard or a mouse, as shown in FIG. 2. The display 104 may comprise a computer monitor, a plasma screen for a PC, a liquid crystal display (LCD) on a hand held device, a touchscreen, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

Figure 3:
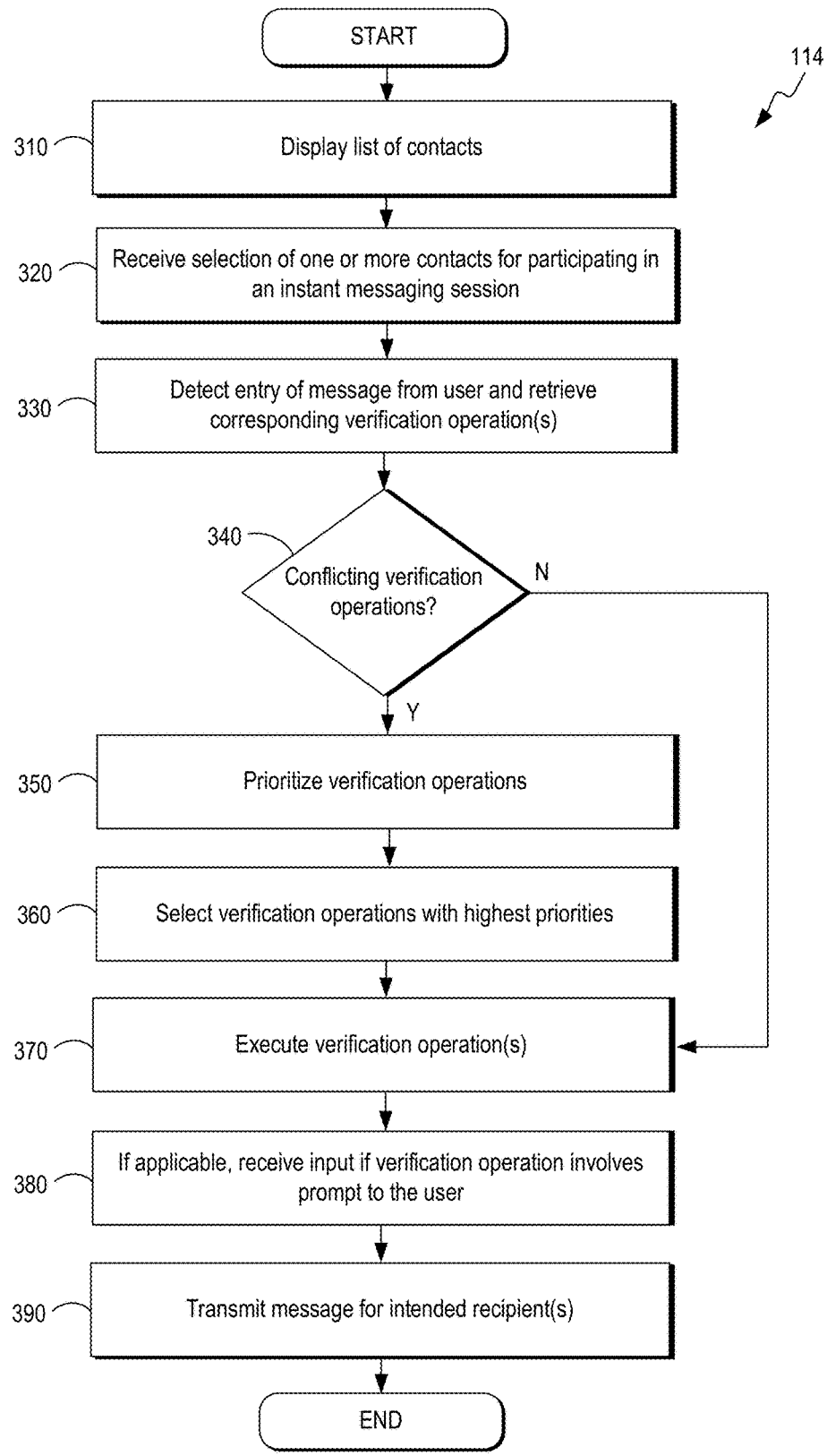
FIG. 3 is a flow chart illustrates functionality performed by various components in the instant messaging device of FIG. 1 in accordance with various embodiments.

Reference is made to FIG. 3, which is a flowchart in accordance with some embodiments for implementing a verification feature in the instant messaging device 102 of FIG. 1. It is understood that the flowchart of FIG. 3 provides merely an example of the many different types of functional arrangements that may be employed to implement the operation of the verification unit 114 and other components in the instant messaging device 102. As an alternative, the flowchart of FIG. 3 may be viewed as depicting an example of steps of a method implemented in the instant messaging device 102 according to one or more embodiments.

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. It is understood that all such variations are within the scope of the present disclosure.

To begin, in block 310, a list of all the user's contacts 122 (FIG. 1) is presented to the user for purposes of selecting one or more contacts 122 to participate in the IM session. In block 320, a selection of one more contact 122 to participate in an IM session is received, and a new IM session is established. In block 330, the verification unit 114 detects when the user attempts to send a message to one or more of the selected contacts 122 selected to participate in the IM session.

At decision block 340, a determination is made on whether any of the verification operations 128 (FIG. 1) associated with the contacts 122 participating in the IM session conflict. If any of the verification operations 128 conflict, the prioritizer 118 prioritizes the verification operations 128 based on their respective priorities 126. If two or more verification operations 128 conflict, then the process to block 350 where the prioritizer 118 prioritizes the verification operations 128. For some embodiments, the prioritizer 118 selects the verification operation 128 among the conflicting verification operations 128 with the highest priority 126 (block 360). The process then proceeds to block 370, which is described below.

Returning to decision block 340, if none of the verification operations 128 conflict, then the process proceeds to block 370 where each of the verification operations 128 is executed. In block 380, input is received from the user if the verification operation 128 involves prompting the user to perform an action (e.g., enter a password or perform a pre-defined gesture on the touchscreen display). Note again that while some verification operations 128 involve prompting the user to perform a certain action (e.g., enter a password), other verification operations 128 do not involve any action the part of the user. In block 390, once the one or more verification operations 128 are successfully executed, the message from the user is sent by the instant messaging application 112 to the intended recipients. Thereafter the process in FIG. 3 ends.

Figure 4:
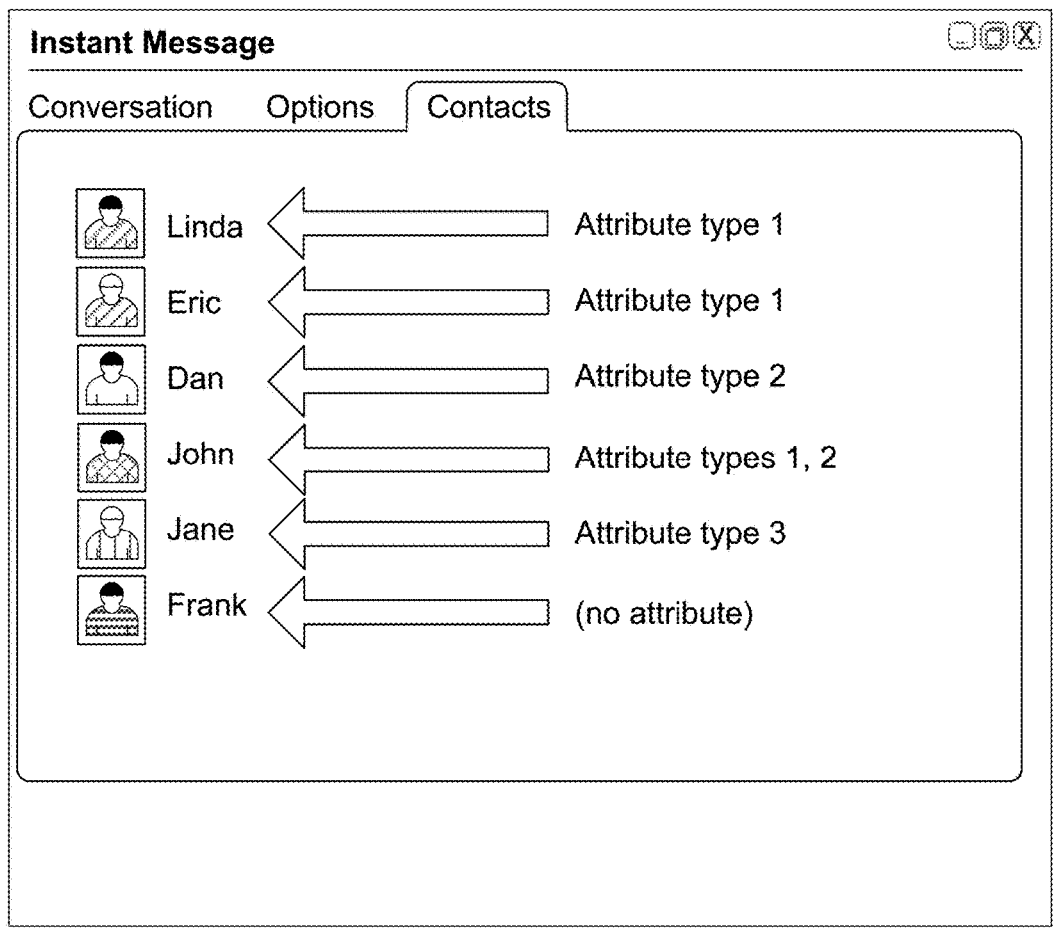
FIG. 4 illustrates an example of a user interface generated by the instant messaging application for conducting an instant messaging session in accordance with various embodiments.

To further illustrate various aspects of the verification feature disclosed herein, reference is made to the following figures. FIG. 4 illustrates an example of a user interface generated by the instant messaging application 112 for conducting an instant messaging session. As shown, all of individuals in the user's contact list with the exception of Frank have been assigned at least one corresponding attribute type. In the example shown, the contact John has been assigned multiple attribute types. Such a scenario may arise, for example, where John is both a work colleague as well as a friend of the user. Note that the user may specify each of the attribute type(s) associated with each contact 122. In this example, attribute type 1 may correspond to a "friend" attribute type whereas attribute type 2 may correspond to a "work" attribute type. Attribute type 3 may correspond to a "family" attribute type. The user may further define the priorities 126 for each attribute type. For example, the user may elect to specify that attribute type 2 ("work" attribute) has the highest priority 126, followed by attribute type 3, and then followed by attribute type 1. As shown in the contacts 122, however, it's possible that in some cases, one or more contacts 122 (e.g., Frank) may not have a corresponding attribute type. For example, the user may not have assigned an attribute for a new contact 122 that was just added.

Figure 5:
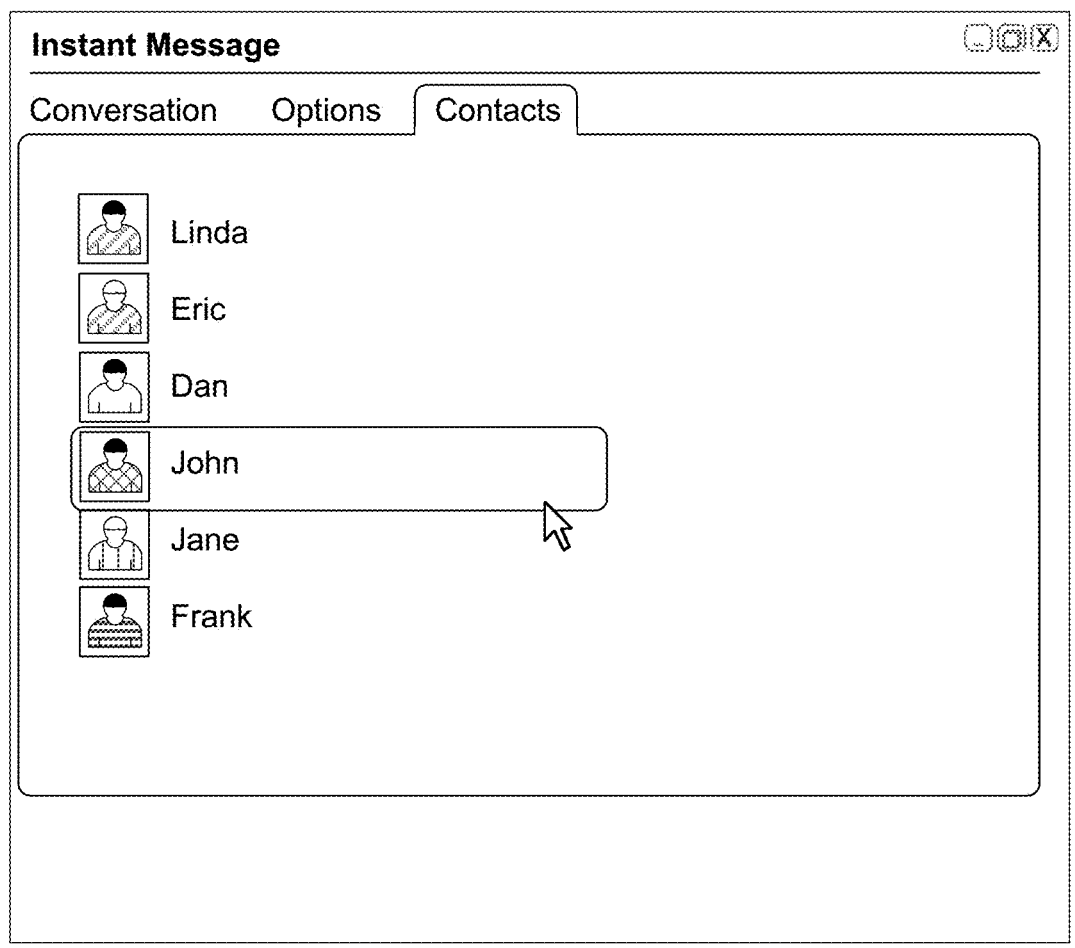
FIG. 5 illustrates an example where the user selects a single contact to participate in an instant messaging session in accordance with various embodiments.

FIG. 5 illustrates an example where the user selects a single contact 122 (John) to participate in an instant messaging session. As shown in FIG. 4, this particular contact has two assigned attribute types (i.e., type 1 and type 2). In the example shown, the contact 122 (John) sends a message, and the user types in a response.

Figure 6:
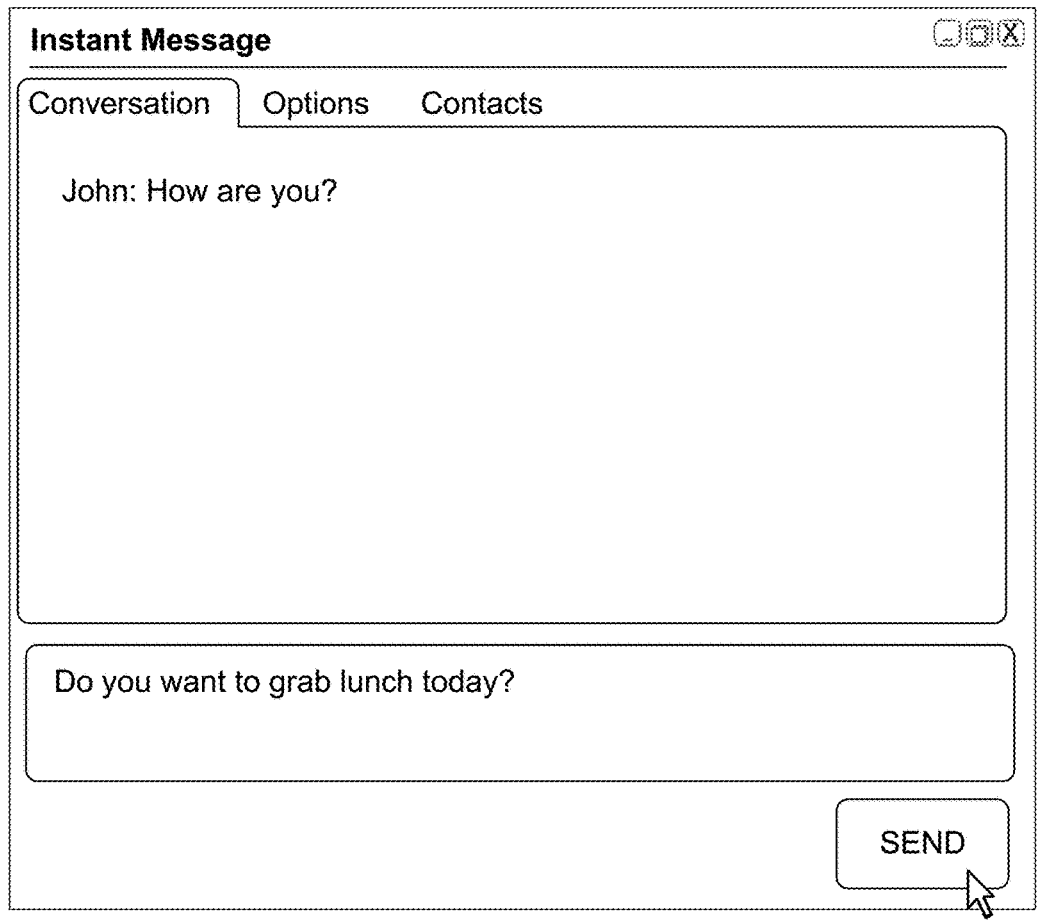
FIG. 6 illustrates execution of verification operations associated with the attribute types in accordance with various embodiments.

With reference to FIG. 6, as soon as a pre-defined trigger event occurs, the verification operations 128 associated with the attribute types (i.e., type 1 and type 2) are executed. In some instances, the pre-defined trigger event may occur before the user begins typing. The pre-defined trigger event may also occur within a period of time between the time when a dialog window is created (when user selects at least one contact to chat with or when the user switches to another chat room) and the time before the message is sent. The pre-defined trigger may also occur when the user presses the send button or as soon as the user begins typing. In the example of FIG. 6, suppose that the verification operation 128 for the type 1 attribute comprises changing the color of the UI component where the user types in messages (now shaded in FIG. 7).

Figure 7:
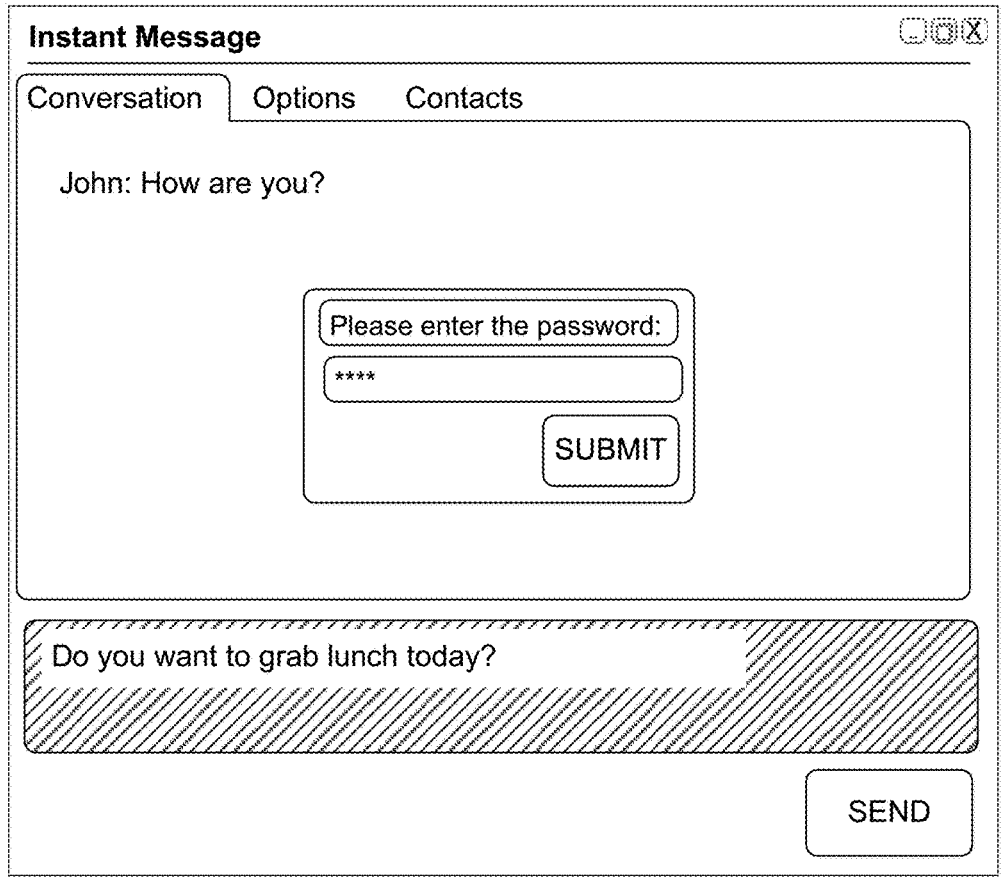
FIG. 7 illustrates an example where the verification operation for a particular attribute comprises changing the color of the UI component where the user types in messages in accordance with various embodiments.

Suppose that the verification operation 128 for the type 2 attribute comprises displaying a dialog box prompting the user to enter a password, as shown in FIG. 7. Since the verification operations 128 do not conflict, both verification operations 128 are executed, where the verification operation 128 with the higher priority being executed first.

Figure 8:
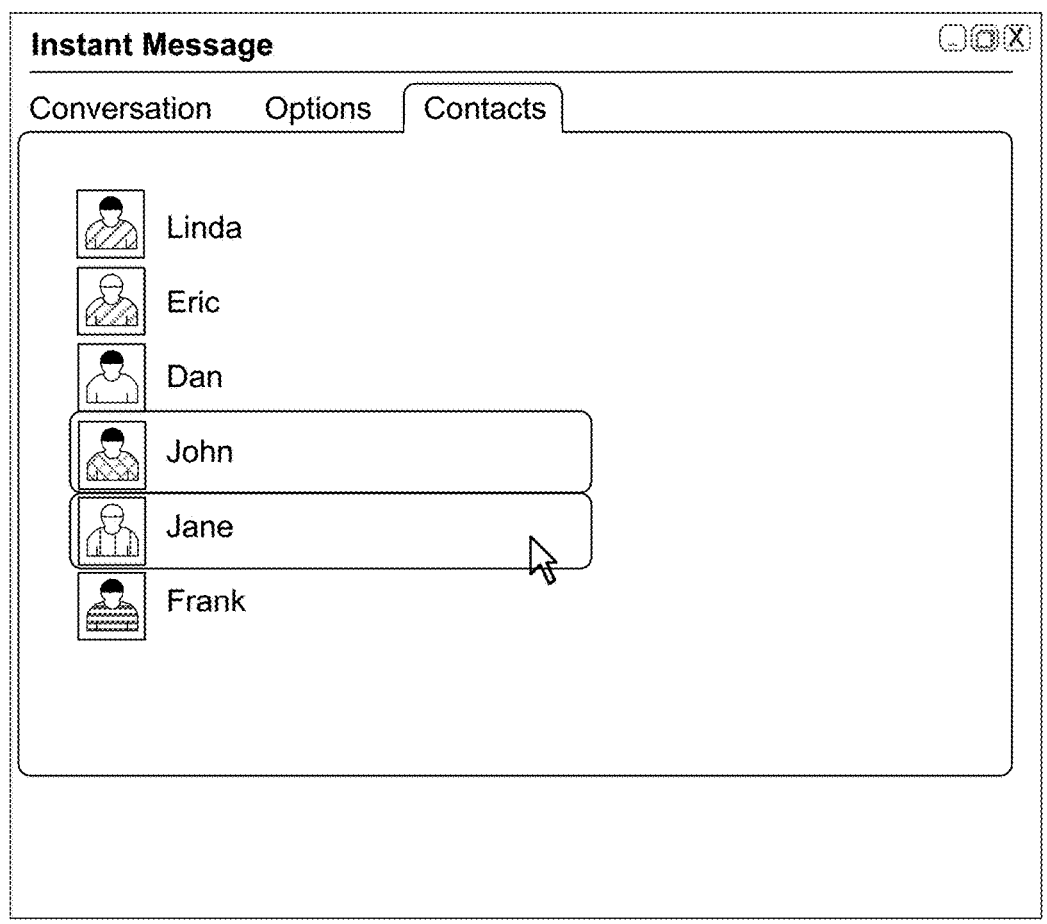
FIG. 8 illustrates an example where multiple contacts are selected to participate in an instant messaging session in accordance with various embodiments.

As another example, reference is made to FIG. 8, where two individuals (John and Jane) are selected to participate in an IM session. With reference back to FIG. 4, John has been assigned attribute types 1 and 2 while Jane has been assigned attribute type 3. In this example, suppose that the verification operation 128 for the type 1 attribute comprises changing the color of the UI component where the user types in messages. Suppose that the verification operation 128 for the type 2 attribute comprises displaying a dialog box prompting the user to enter a password, as shown in FIG. 7. Suppose that the verification operation 128 for the attribute type 3 comprises changing the color of the UI component where the user types in messages where this color differs from the color associated with attribute type 3.

Figure 9:
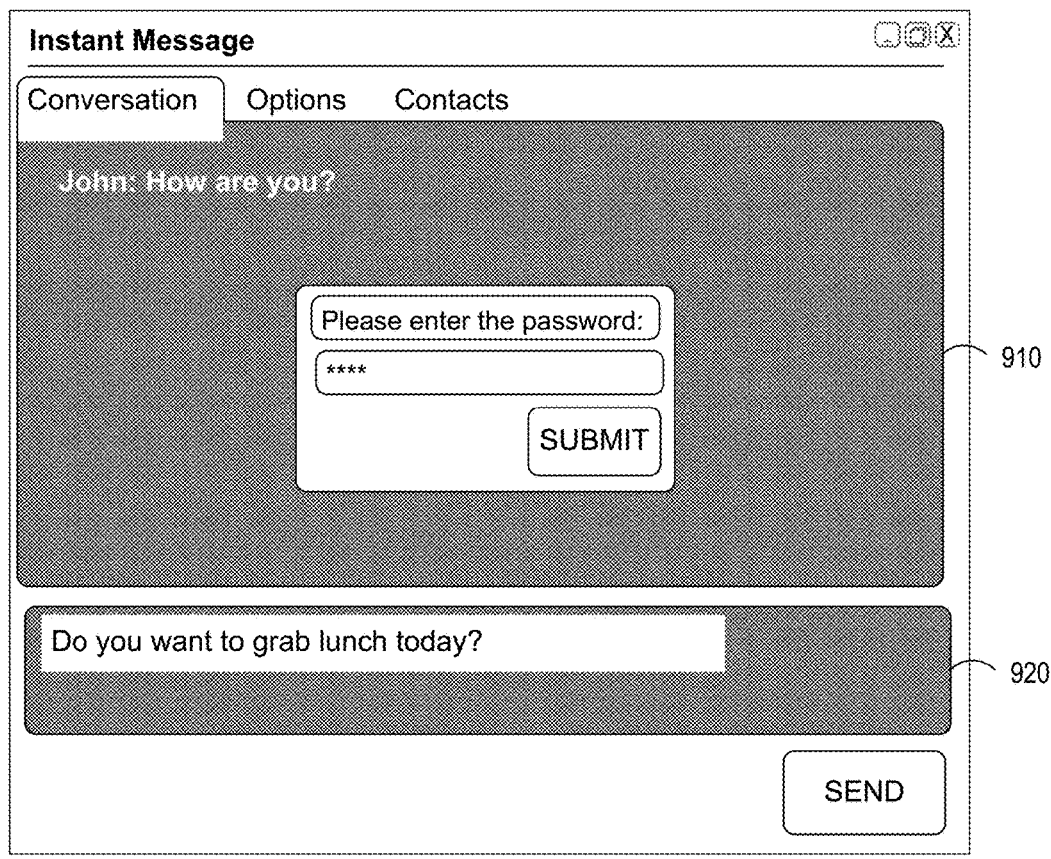
FIG. 9 illustrates an example where a higher priority verification operation is executed in a scenario where multiple verification operations conflict in accordance with various embodiments.

In this scenario, the verification operations 128 for attribute types 1 and 3 conflict since both verification operations 128 involve changing the color of the same UI component. Assume for this example, that attribute type 3 has a higher priority 126 than attribute type 1. As shown in FIG. 9, the verification operation 128 for attribute type 3 takes precedence and is therefore executed, while the verification operation 128 for attribute type 1 is not executed due to the conflict. Since the verification operations 128 for attribute type 3 and attribute type 2 do not conflict, both verification operations 128 associated with these attribute types are executed. (Assume in the example shown that the message typed in by the user is intended for both John and Jane.) In FIG. 9, the UI component where the user types in messages is a different color than the color corresponding to attribute type 1 shown in FIG. 7.

Figure 10A:
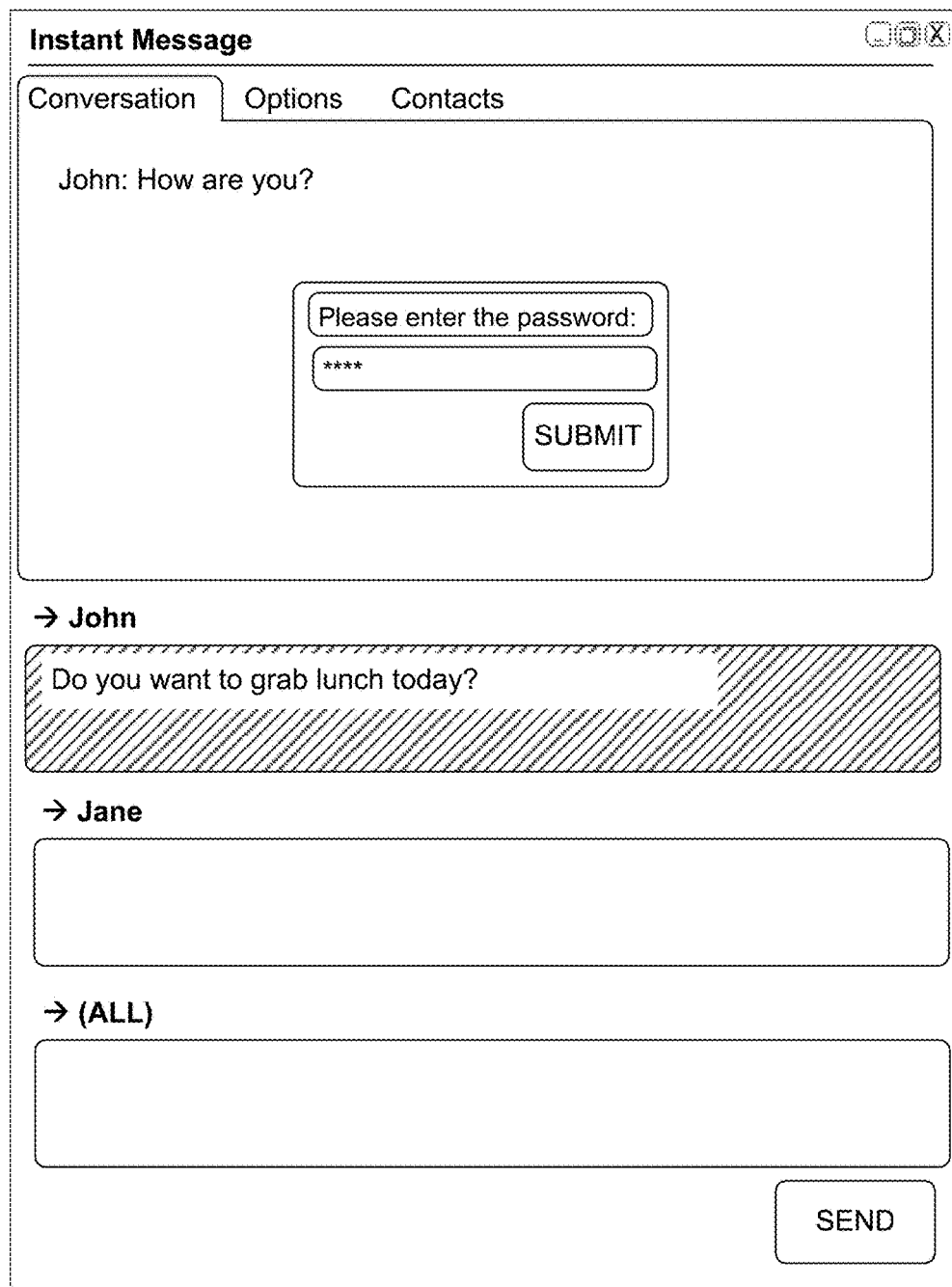
FIG. 10A illustrates an alternative embodiment where separate UI components are provided to the user for directing messages to one of the multiple participants in accordance with various embodiments.

For some implementations, the verification operations 128 may be executed on a contact-by-contact basis even when multiple individuals are participating in an IM session. In some instances, the user may wish to direct a message to only one or a subset of the invited participants. FIG. 10A illustrates an alternative embodiment where separate UI components are provided to the user for directing messages to one of the multiple participants. As also shown, the user also has the option of directing a message to all the participants.

Figure 10B:
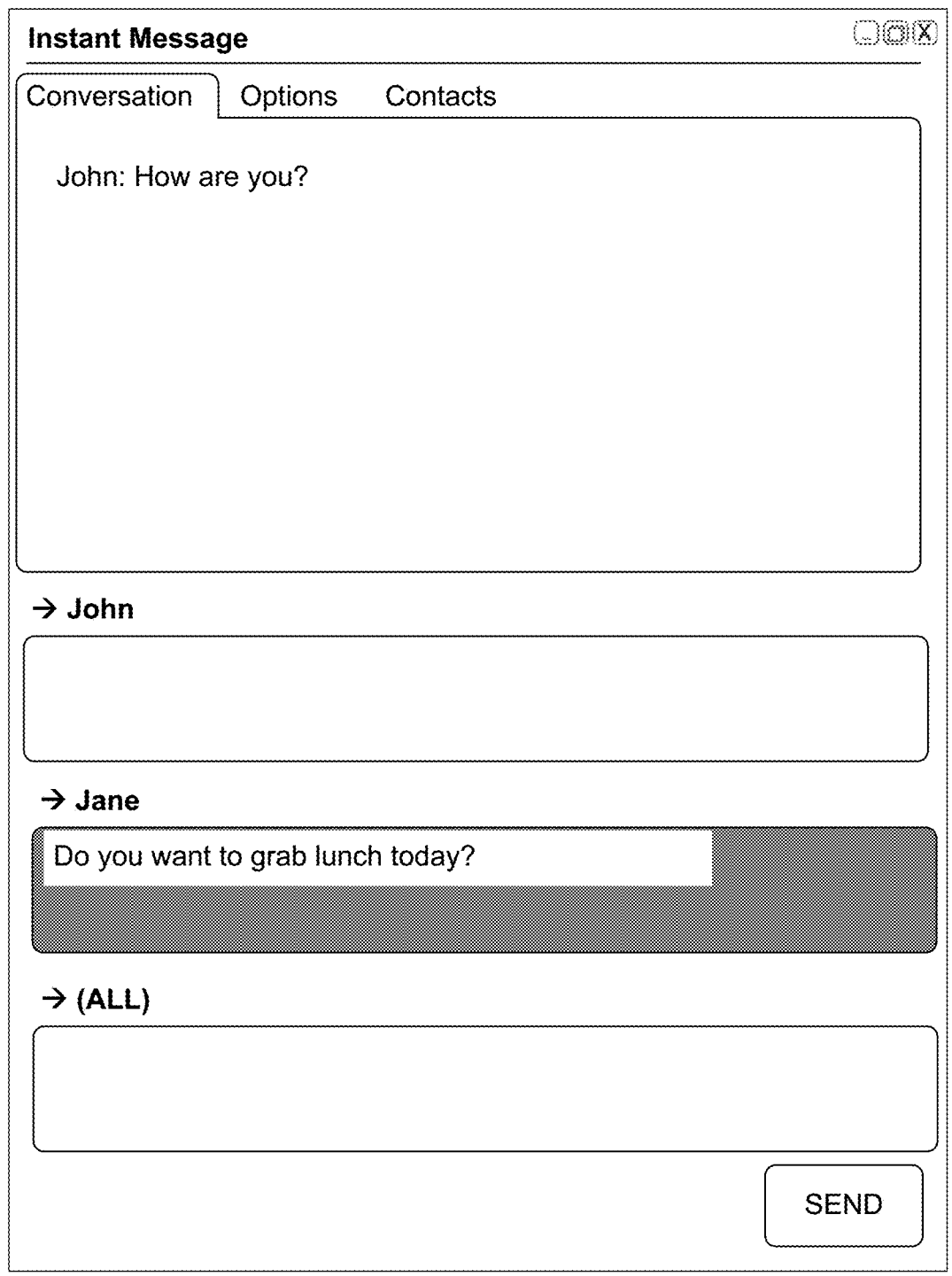
FIG. 10B illustrates an example where the user elects to send a message only to a single contact in accordance with various embodiments.
Figure 10C:
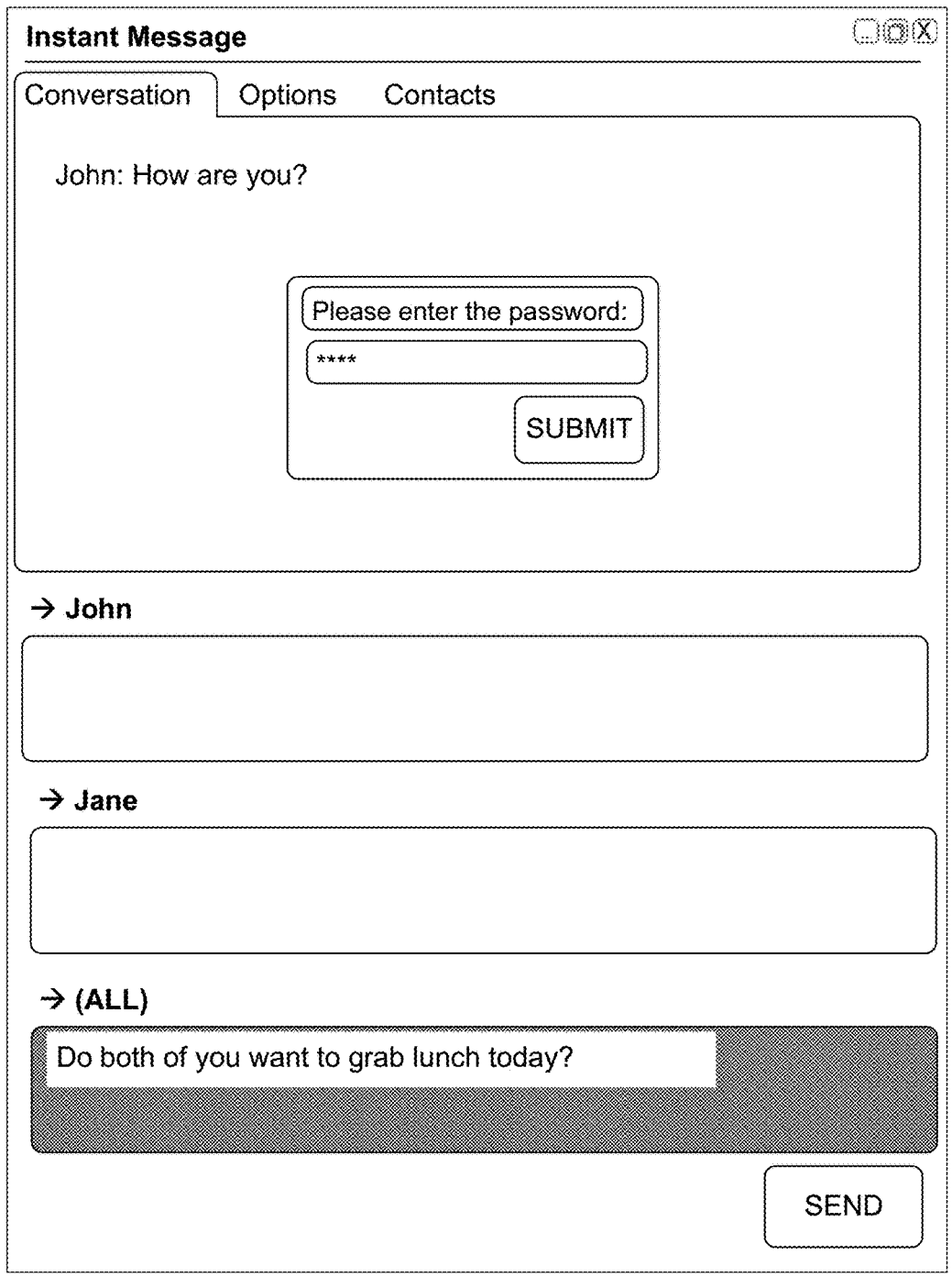
FIG. 10C illustrates an example where the user elects to send a message to all the contacts selected to participate in an instant messaging session in accordance with various embodiments.

In FIG. 10A, the user elects to send a message only to John. In this scenario, the verification operations 128 corresponding to attributes types of John (type 1 and type 2) are executed. In FIG. 10B, the user elects to send a message only to Jane. In this scenario, the verification operations 128 corresponding to attributes type of Jane (type 3) are executed. In FIG. 10C, the user elects to send a message to all the selected participants (both John and Jane). In this scenario, the verification operations 128 corresponding to attributes type of Jane (type 3) are executed. As the verification operations 128 of attribute types 1 and 3 conflict (i.e., both comprise changing a color of the UI component for typing a message), a determination is made that the verification operation 128 for attribute type 2 and type 3 takes precedence and is therefore executed, as described earlier in connection with FIG. 9. This again is based on the underlying assumption that attribute type 3 has a higher priority than attribute type 1. However, in this scenario, the verification operations 128 corresponding to both attribute type 2 and type 3 are executed.

Figure 11:
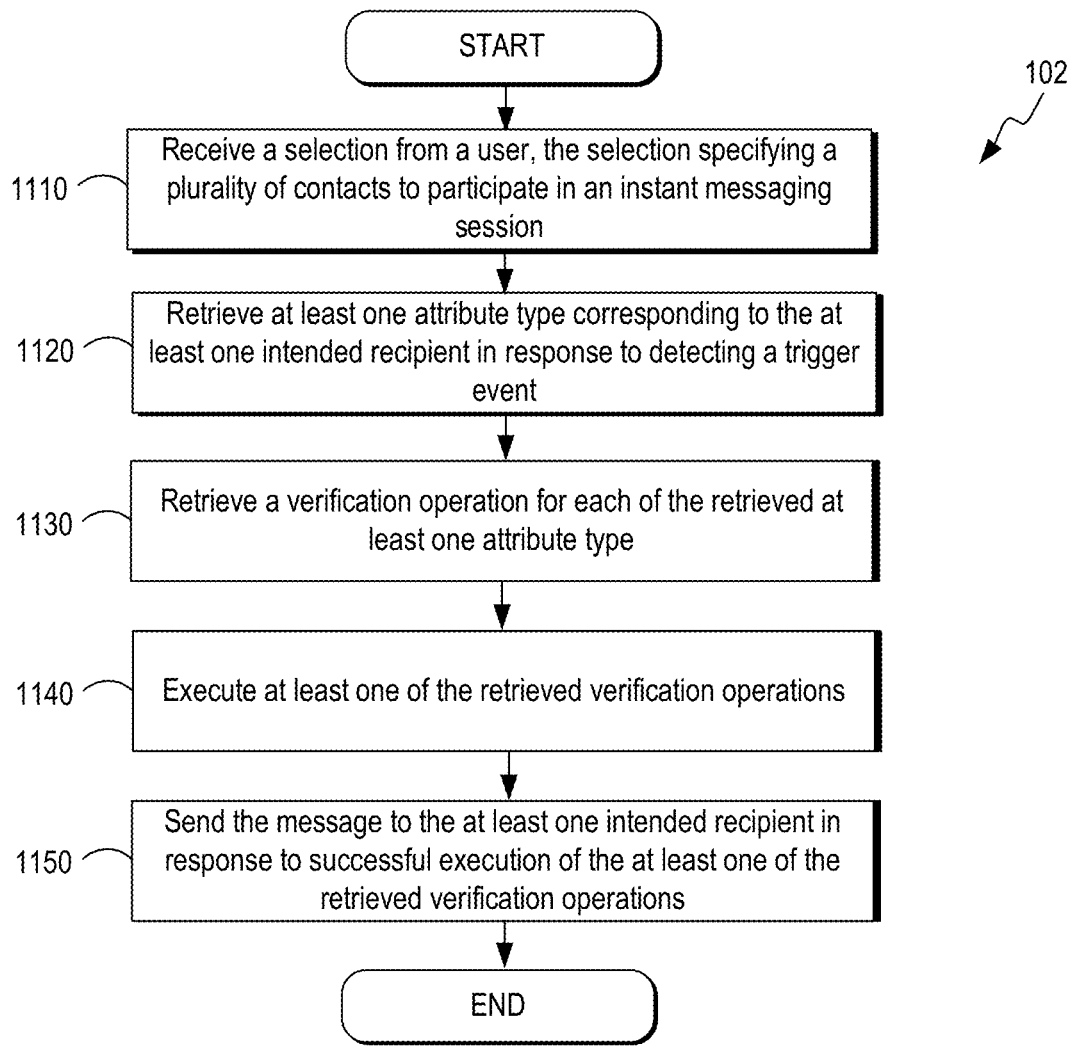
FIG. 11 is a flowchart in accordance with an alternative embodiment for implementing a verification feature in the instant messaging device of FIG. 1.

Reference is made to FIG. 11, which is a flowchart in accordance with an alternative embodiment for implementing a verification feature in the instant messaging device 102 of FIG. 1. It is understood that the flowchart of FIG. 11 provides merely an example of the many different types of functional arrangements that may be employed to implement the operation of the verification unit 114 and other components in the instant messaging device 102. As an alternative, the flowchart of FIG. 11 may be viewed as depicting an example of steps of a method implemented in the instant messaging device 102 according to one or more embodiments.

Although the flowchart of FIG. 11 shows a specific order of execution, it is understood that the order of execution may differ from that which is depicted. For example, the order of execution of two or more blocks may be scrambled relative to the order shown. Also, two or more blocks shown in succession in FIG. 11 may be executed concurrently or with partial concurrence. It is understood that all such variations are within the scope of the present disclosure.

To begin, in block 1110, the instant message device 102 receives a selection from a user, where the selection specifies a plurality of contacts to participate in an instant messaging session. In block 1120, the instant messaging device 102 retrieves at least one attribute type corresponding to the at least one intended recipient. In accordance with various embodiments, the at least one attribute type is retrieved in response to detecting a trigger event relating to a message intended for at least one recipient among the plurality of contacts. The trigger event may comprise, for example, the user typing the message intended for the at least one recipient among the plurality of contacts. As another example, the trigger event may comprise the user manipulating a user interface control for sending the message intended for the at least one recipient among the plurality of contacts.

In block 1130, the instant messaging device 102 retrieves a verification operation for each of the retrieved at least one attribute type. In block 1140, the instant messaging device 102 executes at least one of the retrieved verification operations. In block 1150, the instant messaging device 102 sends the message to the at least one intended recipient in response to successful execution of the at least one of the retrieved verification operations. Thereafter, the process in FIG. 11 ends.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. A method implemented in an instant messaging device, comprising:
   receiving a selection from a user, the selection specifying a plurality of contacts to participate in an instant messaging session;
   retrieving at least one attribute type corresponding to the at least one intended recipient in response to detecting a trigger event relating to a message intended for at least one recipient among the plurality of contacts;
   retrieving a verification operation for each of the retrieved at least one attribute type;
   executing at least one of the retrieved verification operations; and
   sending the message to the at least one intended recipient in response to successful execution of the at least one of the retrieved verification operations,
   wherein executing the at least one of the retrieved verification operations comprises:
   determining whether a conflict exists between the verification operations corresponding to multiple attribute types in response to the at least one intended recipient having multiple attribute types;
   resolving the conflict between the verification operations in response to determining that a conflict exists between verification operations; and
   executing at least one of the verification operations corresponding to the multiple attribute types, wherein all of the verification operations are executed if no conflict exists between the verification operations.

2. The method of claim 1, wherein the trigger event comprises the user typing the message intended for the at least one recipient among the plurality of contacts.

3. The method of claim 1, wherein the trigger event comprises the user manipulating a user interface control for sending the message intended for the at least one recipient among the plurality of contacts.

4. The method of claim 1, further comprising:
   in response to determining that no conflict exists between verification operations, executing each of the verification operations.

5. The method of claim 4, wherein the verification operations are executed according to a corresponding priority, wherein a verification operation with a highest priority is executed first.

6. The method of claim 4, wherein the verification operations are executed in random order.

7. The method of claim 1, wherein resolving the conflict between verification operations comprises:
   selecting a verification operation among the conflicting verification operations with a highest priority; and
   executing only the verification operation with the highest priority.

8. The method of claim 1, wherein the verification operation comprises sending a message within a predetermined period of time, wherein the verification operation further comprises one of: changing a color of a user interface utilized for the instant messaging session; or prompting the user to enter a password and monitoring for entry of a predetermined password.

9. A system, comprising:
   a memory storing instructions; and
   a processor coupled to the memory and configured by the instructions to at least:
   receive a selection from a user, the selection specifying a plurality of contacts to participate in an instant messaging session;
   retrieve at least one attribute type corresponding to the at least one intended recipient in response to detecting a trigger event relating to a message intended for at least one recipient among the plurality of contacts;
   retrieve a verification operation for each of the retrieved at least one attribute type;
   execute at least one of the retrieved verification operations; and
   send the message to the at least one intended recipient in response to successful execution of the at least one of the retrieved verification operations,
   wherein the processor executes the at least one of the retrieved verification operations by:
   determining whether a conflict exists between the verification operations corresponding to multiple attribute types in response to the at least one intended recipient having multiple attribute types;
   resolving the conflict between the verification operations in response to determining that a conflict exists between verification operations; and
   executing at least one of the verification operations corresponding to the multiple attribute types, wherein all of the verification operations are executed if no conflict exists between the verification operations.

10. The system of claim 9, wherein the trigger event comprises the user typing the message intended for the at least one recipient among the plurality of contacts.

11. The system of claim 9, wherein the trigger event comprises the user manipulating a user interface control for sending the message intended for the at least one recipient among the plurality of contacts.

12. The system of claim 9, wherein the processor is further configured by the instructions to:
execute each of the verification operations in response to determining that no conflict exists between verification operations.

13. The system of claim 12, wherein the verification operations are executed according to a corresponding priority, wherein a verification operation with a highest priority is executed first.

14. The system of claim 12, wherein the verification operations are executed in random order.

15. The system of claim 9, wherein resolving the conflict between verification operations comprises:
selecting a verification operation among the conflicting verification operations with a highest priority; and
executing only the verification operation with the highest priority.

16. A non-transitory computer-readable storage medium storing instructions to be implemented by a computing device having a processor, wherein the instructions, when executed by the processor, cause the computing device to at least:
receive a selection from a user, the selection specifying a plurality of contacts to participate in an instant messaging session;
retrieve at least one attribute type corresponding to the at least one intended recipient in response to detecting a trigger event relating to a message intended for at least one recipient among the plurality of contacts;
retrieve a verification operation for each of the retrieved at least one attribute type;
execute at least one of the retrieved verification operations; and
send the message to the at least one intended recipient in response to successful execution of the at least one of the retrieved verification operations,
wherein the computing device executes the at least one of the retrieved verification operations by:
determining whether a conflict exists between the verification operations corresponding to multiple attribute types in response to the at least one intended recipient having multiple attribute types;
resolving the conflict between the verification operations in response to determining that a conflict exists between verification operations; and
executing at least one of the verification operations corresponding to the multiple attribute types, wherein all of the verification operations are executed if no conflict exists between the verification operations.

17. The non-transitory computer-readable storage medium of claim 16, wherein the processor is further configured by the instructions to:
execute each of the verification operations in response to determining that no conflict exists between verification operations.

18. The non-transitory computer-readable storage medium of claim 17, wherein the verification operations are executed according to a corresponding priority, wherein a verification operation with a highest priority is executed first.

* * * * *